Nov. 14, 1967   M. J. KROENING   3,352,313
FOLD-A-DOOR FISH HOUSE
Filed Dec. 23, 1965

INVENTOR.
MARTIN J. KROENING
BY
Schroeder, Siegfried
& Ryan  ATTORNEYS

United States Patent Office 3,352,313
Patented Nov. 14, 1967

3,352,313
FOLD-A-DOOR FISH HOUSE
Martin J. Kroening, 1073 16th Ave. SE.,
Minneapolis, Minn. 55411
Filed Dec. 23, 1965, Ser. No. 515,942
8 Claims. (Cl. 135—1)

ABSTRACT OF THE DISCLOSURE

This disclosure and invention relates to a collapsible ice fishing house which is formed of a front wall section having a door therein and a floor section with suitable fishing openings therein. The remaining top end and side walls are made of a flexible, deformable material integrally connected together and to the edges of the front wall section and floor section to make a complete enclosure. The floor section is pivotally connected to the front wall section. The front wall section also includes ski type runners mounted on the front thereof on either side of the door to provide the surface upon which the ice fishing house is to be transported.

---

Figure 1:
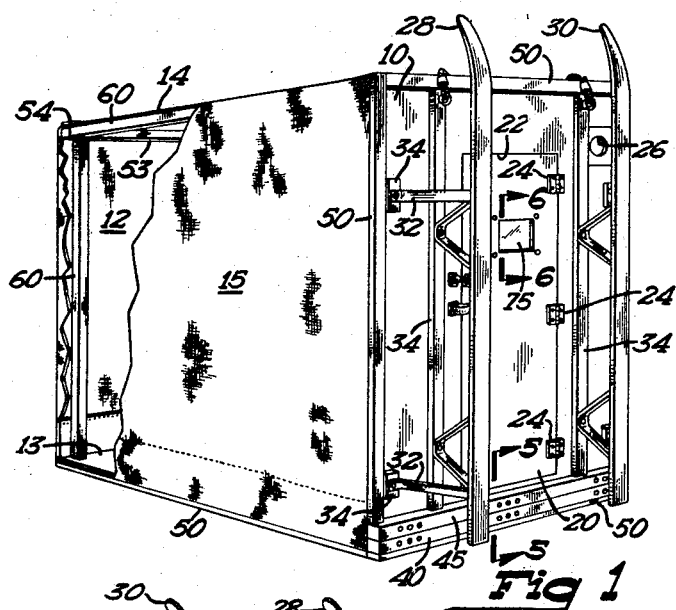

This invention relates to collapsible and portable ice fishing houses and more particularly to an improved and simplified collapsible ice fishing house with means to transport the same.

Portable and collapsible structures of this general type are known and in use. With the increased popularity of wintertime fishing through the ice, portable structures for this purpose have come into usage. Generally such structures are not collapsible and hence require a means for positioning the same in an area or location of usage with considerable effort. Where such structures have previously been made collapsible, they have been generally so complex in design and difficult to set up that they are not readily movable or disassembled. Further the cost of the same and the problems of transporting such units have limited their application and have prevented the user of such houses from readily changing locations or areas for fishings.

The present invention is directed to a simplified collapsible and portable ice fishing house which may be readily erected and disassembled, is compact in design and includes its own sled type runners so that it may be readily transported to any and all locations such as to be set up and disassembled after each usage. It further may be readily transported in a car, providing the user with great mobility and choice in fishing areas. This improved collapsible and portable fishing house includes two solid wall sections, or a floor and front wall, with the remaining portion of the same being made flexible and collapsible such that the unit will fold together in a compact, lightweight structure which is airtight, easily assembled and readily portable. Further the design is simplified and includes a minimum number of removable parts so as to be easily used, is low in cost and available for all sportsmen. The improved collapsible ice fishing house is assembled by unfolding the structure and positioning removable struts in the proper position to maintain the fishing house in an erected position. Further the improved ice fishing house has a door to permit ready access or ingress and egress from the same. Thus the improved structure does not have to be disassembled or reassembled at each entrance or usage. In addition the improved structure incorporates sled type runners on a portion of the same to make it readily transportable in a collapsed position.

It is therefore an object of this invention to provide an improved collapsible ice fishing house.

Another object of this invention is to provide a collapsible ice fishing house which incorporates sled type runners for ready transportation of the same.

A still further object of this invention is to provide a collapsible ice fishing house which is lightweight, ready assembled and disassembled, and is a tight sealed structure with a minimum number of removable parts.

A still further object of this invention is to provide in a collapsible ice fishing house a simplified design which is low in cost and simple to maintain.

Figure 4:
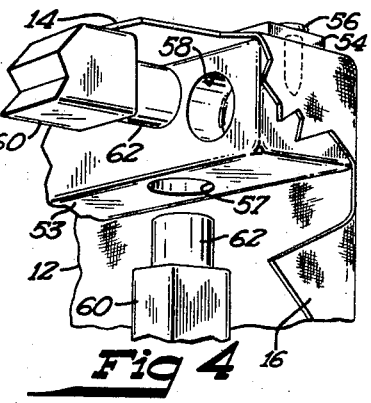
Figure 2:
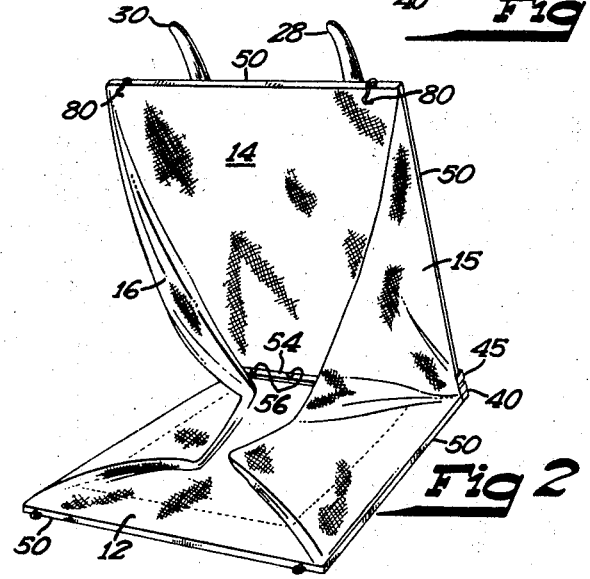
Figure 5:
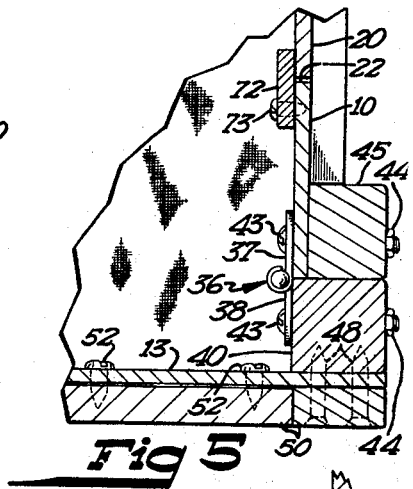
Figure 3:
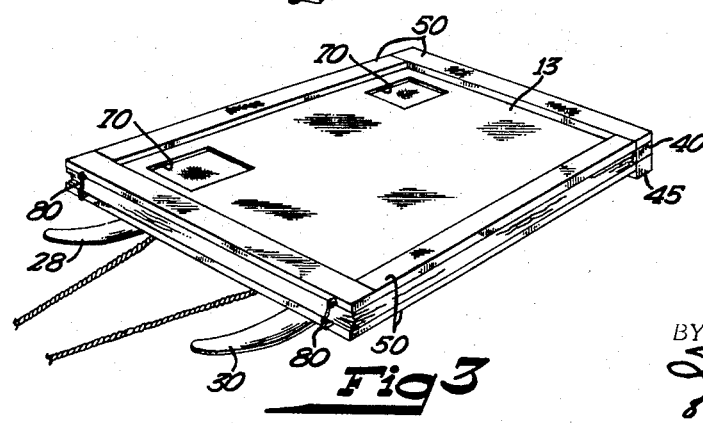
Figure 6:
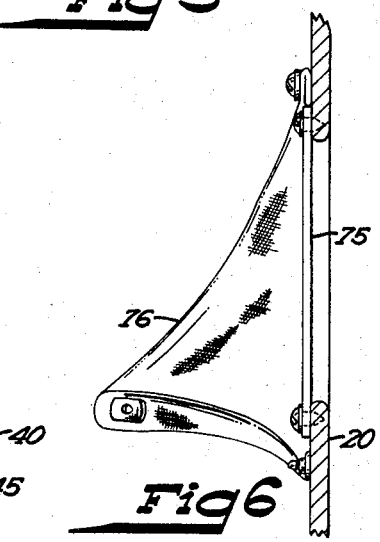

These and other objects of this invention will become apparent from a reading of the attached description together with the drawings wherein:

FIGURE 1 is a perspective view of the improved collapsible ice fishing house,

FIGURE 2 is a perspective view of the collapsible ice fishing house of FIGURE 1 showing the same in a partially collapsed condition, FIGURE 3 is a perspective view of the collapsible ice fishing house of FIGURE 1 in a collapsed condition, FIGURE 4 is a perspective view of a portion of the ice fishing house of FIGURE 1 showing assembly details of the same, FIGURE 5 is a sectional view of the collapsible ice fishing house of FIGURE 1 taken along the lines 5—5 therein, and FIGURE 6 is a sectional view of the improved collapsible ice fishing house of FIGURE 1 taken along the lines 6—6 therein.

My improved collapsible ice fishing house is shown in perspective in FIGURE 1 as a generally rectangular structure having a front wall section 10, a back wall section 12, a floor 13, a top or roof section 14, and side wall sections 15 and 16, respectively. In this enclosure or house, only the front wall section 10 and the floor 13 are formed of a suitable solid material such as wood or the like. The front wall section includes a door 20, pivotally mounted in an opening 22 therein by hinges 24. It also includes a cylindrical aperture 26 adapted to receive a venting pipe from a stove normally positioned in the enclosure. Also mounted on the front wall section are a pair of ski or sled type runners 28, 30 which are positioned on either side of the door and mounted thereon through suitable bracing structures 32 attached to the front wall section at supporting strips 34. The runners extend away from the front wall 10 to be spaced therefrom and, as will be later noted, are utilized for transporting the fishing house in a collapsed condition. Further the runners 28, 30 extend longer than the height of the enclosure such that the forward edges of the same project beyond the end of the house in the transporting condition for ease in handling.

The floor 13 which is pivotally connected to the front wall section 10 through a hinge structure 36 having flanges 37, 38' which connect respectively to the front wall section 10 and a spacer block 40, as will be best seen in FIGURE 5. The flange portion 37 of the hinge 36 is connected to the lower edge of the front wall section 10 by means of series of nuts and bolts 43, 44 with a suitable end spacing strip 45 positioned on the outer face thereof. The spacer block or strip 40 mounts the flange portion 38 of the elongated hinge structure which extends the full width of the enclosure and is similarly secured to the spacer block by means of the nuts and bolts 43, 44 respectively. The floor 13 is connected to the spacer block 40 at the lower edge thereof through suitable screw means, as shown in phantom at 48 in FIGURE 5. Thus, as will be later noted, the floor or front wall will be pivoted toward the opposite structure with a predetermined spacing provided therebetween in which will be positioned the remaining portion of the enclosure. Further the front wall section 10, will be positioned in substantial parallelism with the floor 13 in the collapsed position for compactness in structure.

The remaining walls and top sections 12, 16, 15 and 14 respectively of the enclosure are made of a flexible and deformable material, such as a cloth or canvas, which is sewn together or otherwise suitably connected to form an integral structure in the form of the rectangular enclosure. For purposes to be later noted, the side wall sections 15, 16 are preferably square, that is the height of the enclosure and the depth of the enclosure are of the same dimension. The forward edge of the side wall sections, the forward edge of the top wall section 14 and the bottom edge of the side wall sections 15, 16 together with the bottom edge of the rear or back wall section 12 are turned over and attached to the edges of the floor 13 and the front wall section 10 where they join the same with batten strips or supporting strips of wood or similar material, such as is indicated at 50, positioned over the ice and secured thereto by screw 52 to firmly attach the walls, top and back of the enclosure to the solid portions thereof. In addition, the batten or support strips 50 on the undersurface of the floor serve to provide a spacer between the floor and the ground in the support of the same.

At the junction of the rear or end wall section 12 and the top or roof section 14, is positioned a support rod or elongated member 53, generally square in cross-section, which extends the entire width of the enclosure and is secured to fabric or canvas through a suitable backing plate or batten strip 54 through suitable screws 56 along the extent of the same. The support rod or member 53 provides the form for the upper rear corner of the enclosure and includes a plurality of apertures or holes 57, 58 at the extremities of the same which are slightly offset, as will be seen in FIGURE 4, for purposes to be later noted. The cross-sectional dimension of member 53 is slightly less than the cross-sectional dimension of the spacer member 40 such that the support rod or member with the canvas attached thereto may be positioned between the floor 13 and the front wall section 10 in the collapsed condition of the enclosure. The support member or rod 53 is held in an elevated position to complete the form of the enclosure by means of a plurality of removable support members or struts 60 which are of the same cross-sectional dimension and include peg or dowel portions 62 at one extremity of the same adapted to fit into the holes 57, 58 in the extremities of the support member 53. The opposite extremities of the members or struts 60 are squared and two such members inserted into the holes 57 in the lower surface of the support member 53 will elevate the same with the squared or blunt extremity of the support struts positioned on the surface of the floor. Similarly two such units are incorporated at the upper sides of the enclosure with the dowel extremities 62 fitting into the apertures 58 in the extremity of the support member 53. The support struts 60 normally frictionally engage the floor and front wall sections to hold the enclosure in an erected condition positioning or spacing the support member 53 for this purpose. Suitable flanges or tabs may be used to hold the blunt or squared extremities of the support member 60 at the top edge of the enclosure and bearing against the front wall section, if desired. The removable support struts or members fit in the support member 53 in an offset relationship so that the strength of the support member 53 will be maintained. The removable struts are placed on the interior of the enclosure as is the support member 53 and with the edges of the canvas material sealed to the floor and front wall, a relatively airtight enclosure is obtained. Suitable holes 70 are included in the base or floor 13 through which fishing is accomplished. In addition, the front wall section includes backing strips 72 around the door suitably secured to the front wall such as by screws 73, and these strips form a stop for the door as well as a light seal for the same. The front wall section also includes a window 75 therein with a suitable canvas flap, such as is indicated at 76, adapted to be pulled over and buttoned over the window whenever it is desired to maintain the interior of the enclosure in darkness.

This improved collapsible and portable fishing house is readily erected and disassembled in a minimum amount of time and with a minimum amount of effort. To disassemble the same, the support struts 60 are removed from the assembled position and placed on the floor. Simultaneously with their removal, the deformable wall sections will collapse. To pack or condition the enclosure for transportation purposes, the upper rear corner, as defined by the support member 53, is positioned adjacent the hinge 36 connecting the front wall and floor 13. The spacer block 40 is of slightly larger dimension and the dimensions of the side wall sections are such that the support member or rod 53 may be positioned near or adjacent the spacer block 40 with the side walls 15, 16 of the enclosure being effectively folded in half. Thus as the enclosure is collapsed, the condition presented in FIGURE 2 is obtained where the side wall sections may be infolded into triangular form against the junction of the floor and front wall section and adjacent the back and top wall sections in the infolded condition to provide a compact structure. The removable strut members are held within the enclosure for storage and transportation purposes, and the entire assembly is held together with suitable means, such as hooks 80, extending between the free edges of the floor and front wall section. As the enclosure or fishing house is disassembled, the front wall section will normally be folded down on the floor and the entire structure will be inverted such that the skis or runners 28, 30 will be positioned on the ground or surface to slide and transport the same. The improved structure is lightweight, compact in design and may be readily moved into position on ice for usage without the requirement of driving a car out on the same. Thus the danger of erecting the house on thin ice which is unable to support the weight of a car is alleviated. Similarly this compact structure is small enough such that it may be readily positioned on a vehicle or in the trunk of the same for transportation purposes. The simplified structure may thus be readily set up and dismantled with each usage of the same eliminating the risk of leaving the enclosure or fishing house unattended. It further provides mobility to the ice fisherman in that he may transport his fishing house to any and varied locations for usage of the same. The simplified structure is readily erected by merely opening the enclosure, that is, separating the floor from the front wall section, by release of the hooks 80. Normally the structure is positioned over a hole or holes drilled through the ice such that the holes 70 in the floor of the same will be in a proper position, that is either over a preformed hole or in a location where a hole is to be drilled. Whenever the front wall section is released from the floor, it will be raised to a 90 degree relationship with the floor, the side wall flaps extend and the support member 53 pulled out so that the support struts 60 may be inserted to raise the enclosure to the erected position. The insertion of the removable struts 60 against the support rod 53 and bearing against the front wall and floor will place the enclosure in a condition for operation. The provision of a vent hole 26 in the front of the enclosure allows for the installation of a stove within the same. Further the door provides ready access for ingress or egress without disassembly of the house. Similarly the window 75 in the door allows sufficient light within the enclosure for any desired operating condition and this light may be shut out by moving the canvas flaps 76 over the same when desired. The edges of the canvas walls are sealed to the rigid portions of the enclosure to provide a relatively airtight structure which is warm and durable. It will be recognized that the canvas bearing corners of the front wall and floor and the edges of the support member 53 may be smoothed off or rounded to minimize wear and possible tearing in the canvas material. Further the batten strips may be offset slightly from the edges of the floor and front wall to protect the canvas. The simplified structure is relatively low in cost and thereby is available to all ice fishermen. The elongated runners 28, 30 permit simple maneuverability of the enclosure during transportation of the same.

In considering this invention is should be remembered that the present disclosure is intended to be illustrative only and the scope of the invention should be determined by the appended claims.

What is claimed is:

1. A collapsible ice fishing house comprising:
   (a) a front wall section having a door pivotally mounted therein;
   (b) a solid floor section pivotally connected to the front wall section, said floor section and said front wall section being made of a rigid material;
   (c) flexible and deformable side, top and end wall sections integrally connected to one another and connected to the edges of the front wall section and floor section to make a complete enclosure;
   (d) a rigid support member connected to the top and end wall sections at the junction thereof within the enclosure;
   (e) removable support means adapted to be positioned between the rigid support member within the enclosure and the front wall and floor sections to support the enclosure in an erected position;
   (f) and spacer means pivotally connecting the solid floor wall section to the front wall section and spacing the same therefrom so that when the floor section is pivoted toward the front wall section the space therebetween will enclose the rigid support member together with the flexible side and top wall sections of the enclosure.

2. The collapsible ice fishing house of claim 1 in which the front wall section has ski type transporting and supporting runners mounted on either side of the door therein and projecting outwardly therefrom to support the ice fishing house in a transporting condition and permit movement of the same.

3. A collapsible ice fishing house comprising:
   (a) a front wall section having a door pivotally mounted therein;
   (b) a solid floor section pivotally connected to the front wall section, said floor section and said front wall section being made of a rigid material;
   (c) flexible and deformable side, top and end wall sections integrally connected to one another and connected to the edges of the front wall section and floor section to make a complete enclosure;
   (d) a rigid support member connected to the top and end wall sections at the junction thereof;
   (e) removable support structures formed of a rigid material and adapted to be positioned between the rigid support member and the front wall and floor sections at the rear wall and top walls thereof for support of the enclosure in an erected position;
   (f) said floor section being spaced from the front wall section to enclose the rigid support member and the flexible side, end and top wall sections therebetween when the floor section is pivoted toward the front wall section, said front wall section having ski type transporting and supporting runners mounted on either side of the door and projecting outwardly therefrom to support the ice fishing house in a transporting condition to permit movement of the same;
   (g) and a spacer member included in the pivotal connection between the floor section and the front wall section to space the floor section from the front wall section as the floor section is pivoted from a position normal to the front wall section to a position in which the floor section is parallel with the front wall section.

4. The collapsible ice fishing house of claim 3 in which the front wall section and the floor section are made of a wood material and the side, end and top wall section are made of a canvas material.

5. The collapsible ice fishing house of claim 4 in which at least the side wall sections of square dimension and the rigid support member is of smaller dimension than the spacer to permit the spacer to be moved to a position adjacent the pivotal connection between the floor section and the front wall section in the collapsing of the ice fishing house and the folding of the canvas walls upon the same such that the floor section will be substantially parallel to the front wall section in the collapsed position.

6. The collapsible ice fishing house of claim 5 in which the removable support structures include prongs at one extremity thereof adopted to fit into apertures in the rigid support member and in which the opposite extremities of the support structures frictionally engage respectively the front wall section and floor section to maintain the rigid support member together with the top, end and side walls of the ice fishing house in an erected condition.

7. The collapsible ice fishing house of claim 6 in which the front wall section includes a venting aperture adapted to mount a stove pipe for a stove within the ice fishing house and in which the floor section includes an aperture adapted to permit fishing from the interior of the house through the same.

8. The collapsible ice fishing house of claim 7 in which the canvas top and end wall sections are secured to the rigid support member and the front wall and floor sections of the ice fishing house with batten strips.

References Cited

UNITED STATES PATENTS

| | | | |
|---|---|---|---|
| 2,473,076 | 6/1949 | Scheibner | 135—4 |
| 2,632,454 | 3/1953 | Skogen | 135—4 |
| 2,780,471 | 2/1957 | Iempke | 135—4 |
| 2,891,562 | 6/1959 | Kruczynski | 135—1 |
| 3,017,194 | 1/1962 | Anderson | 135—3 |
| 3,058,480 | 10/1962 | Blanchard | 135—1 |

REINALDO P. MACHADO, *Primary Examiner.*